US008521682B2

(12) United States Patent
Jang et al.

(10) Patent No.: US 8,521,682 B2
(45) Date of Patent: Aug. 27, 2013

(54) TRANSFER OF DATA FROM TRANSACTIONAL DATA SOURCES TO PARTITIONED DATABASES IN RESTARTABLE ENVIRONMENTS

(75) Inventors: Jing-Song Jang, Cupertino, CA (US); James Michael Mcardle, Austin, TX (US); Michael John Elvery Spicer, Lafayette, CA (US)

(73) Assignee: International Business Machines Corporation, Armonk, NY (US)

( * ) Notice: Subject to any disclaimer, the term of this patent is extended or adjusted under 35 U.S.C. 154(b) by 1024 days.

(21) Appl. No.: 12/016,092

(22) Filed: Jan. 17, 2008

(65) Prior Publication Data
US 2009/0187917 A1 Jul. 23, 2009

(51) Int. Cl.
*G06F 17/00* (2006.01)

(52) U.S. Cl.
USPC ........... 707/607; 707/687; 707/790; 707/899; 707/964

(58) Field of Classification Search
USPC .......................... 707/607, 687, 790, 964, 899
See application file for complete search history.

(56) References Cited

U.S. PATENT DOCUMENTS

| | | | |
|---|---|---|---|
| 5,960,194 A | 9/1999 | Choy et al. | |
| 6,240,442 B1 | 5/2001 | Domenikos et al. | |
| 6,289,474 B1 | 9/2001 | Beckerle | |
| 6,473,774 B1 | 10/2002 | Cellis et al. | |
| 6,480,941 B1 | 11/2002 | Franke et al. | |
| 6,571,282 B1 * | 5/2003 | Bowman-Amuah | 709/219 |
| 6,662,307 B1 | 12/2003 | Sipple et al. | |
| 6,681,348 B1 | 1/2004 | Vachon | |
| 6,845,384 B2 | 1/2005 | Bamford et al. | |
| 6,895,487 B2 | 5/2005 | Thusoo et al. | |
| 6,898,608 B2 | 5/2005 | Hopeman et al. | |
| 7,028,056 B1 | 4/2006 | Hendel et al. | |
| 7,149,929 B2 | 12/2006 | Chaurasia | |
| 7,237,139 B2 | 6/2007 | Hamilton, II et al. | |
| 7,490,268 B2 | 2/2009 | Keromytis et al. | |
| 7,577,667 B2 | 8/2009 | Hinshaw et al. | |
| 7,653,665 B1 * | 1/2010 | Stefani et al. | 714/19 |
| 7,689,565 B1 | 3/2010 | Gandhi et al. | |
| 7,730,489 B1 | 6/2010 | Duvur et al. | |
| 7,779,404 B2 | 8/2010 | Movassaghi et al. | |
| 7,933,873 B2 | 4/2011 | Jang et al. | |
| 2002/0049815 A1 | 4/2002 | Dattatri | |
| 2002/0161778 A1 | 10/2002 | Linstedt | |
| 2003/0084142 A1 | 5/2003 | Casati et al. | |

(Continued)

OTHER PUBLICATIONS

Office Action History of U.S. Appl. No. 12/016,039, dates ranging from Jun. 10, 2010 to Mar. 18, 2011.

*Primary Examiner* — Sana Al Hashemi
(74) *Attorney, Agent, or Firm* — Patterson & Sheridan, LLP

(57) ABSTRACT

Method, system, and computer program product for transferring data from transactional data sources to partitioned databases are provided. One or more messages from a transactional data source are read. Each message includes one or more records to be inserted into a database comprising a plurality of partitions. One of the partitions of the database in which the one or more records of each message are to be inserted is then identified. A transaction is initiated to insert the one or more records of each message into the one partition and to delete the one or more messages from the transactional data source. The transaction is committed only when insertion of the one or more records of each message into the one partition and deletion of the one or more messages from the transactional data source succeed.

14 Claims, 3 Drawing Sheets

(56) References Cited

U.S. PATENT DOCUMENTS

| | | |
|---|---|---|
| 2003/0115207 A1 | 6/2003 | Bowman et al. |
| 2004/0243618 A1 | 12/2004 | Malaney et al. |
| 2004/0267835 A1 | 12/2004 | Zwilling et al. |
| 2004/0268244 A1 | 12/2004 | Levanoni et al. |
| 2006/0010180 A1 | 1/2006 | Kawamura et al. |
| 2006/0123204 A1 | 6/2006 | Brown et al. |
| 2006/0136354 A1 | 6/2006 | Bell et al. |
| 2007/0011167 A1 | 1/2007 | Krishnaprasad et al. |
| 2007/0033281 A1 | 2/2007 | Hwang et al. |
| 2008/0091714 A1 | 4/2008 | Idicula et al. |
| 2009/0187787 A1 | 7/2009 | Jang et al. |
| 2009/0187917 A1 | 7/2009 | Jang et al. |

* cited by examiner

TRANSFER OF DATA FROM TRANSACTIONAL DATA SOURCES TO PARTITIONED DATABASES IN RESTARTABLE ENVIRONMENTS

CROSS-REFERENCE TO RELATED APPLICATIONS

The present application is related to co-pending U.S. patent application Ser. No. 12/015,836, entitled "Handling Transfer Of Bad Data To Database Partitions In Restartable Environments" and co-pending U.S. patent application Ser. No. 12/016,039, entitled "Transfer Of Data From Positional Data Sources To Partitioned Databases In Restartable Environments", both of which are filed on even day herewith and co-assigned to the assignee of the present application.

BACKGROUND

Transferring large volumes of data from a transactional data source to a partitioned database in a restartable environment requires high data throughput, no data loss, and no data duplication. High data throughput allows for real-time transfer of the large volumes of data. Additionally, if the transfer of the large volumes of data fails before all of the data have been transferred and is later restarted, then there needs to be some assurances that any data not yet transferred is not lost and any data already transferred is not transferred again.

SUMMARY

Method, system, and computer program product for transferring data from transactional data sources to partitioned databases are provided. In one implementation, one or more messages from a transactional data source are read. Each message includes one or more records to be inserted into a database comprising a plurality of partitions. One of the partitions of the database in which the one or more records of each message are to be inserted is then identified. A transaction is initiated to insert the one or more records of each message into the one partition and to delete the one or more messages from the transactional data source. The transaction is committed only when insertion of the one or more records of each message into the one partition and deletion of the one or more messages from the transactional data source succeed.

DETAILED DESCRIPTION

This disclosure generally relates to transferring data from transactional data sources to partitioned databases in restartable environments. The following description is provided in the context of a patent application and its requirements. Accordingly, this disclosure is not intended to be limited to the implementations shown, but is to be accorded the widest scope consistent with the principles and features described herein.

High data throughput, no data loss, and no data duplication are required when transferring large volumes of data from transactional data sources to partitioned databases in restartable environments. A transactional data source may be, for instance, a queue storing messages or other types of data packets. The types of data that may be stored in a transactional data source include, for instance, stock prices, GPS (Global Positioning System) locations, RFID (Radio Frequency Identification) tags, or the like. A partitioned database is a database that has been divided into multiple partitions based on values in one or more database table columns. Each column upon which partitioning of a database is based is also referred to as a partitioning key. A restartable environment is an environment that can restart where it left off when failure occurred.

High data throughput is required because the type and amount of data being transferred need to be transferred in real-time. No data loss is required because if data transfer fails as a result of, for instance, system shut down, application error, loss of connection, or the like, and is later restarted, then data that has not been successfully transferred cannot be lost. No data duplication is required because in the event of a failure and restart, any data that has already been successfully transferred cannot be transferred again. Otherwise, databases will have duplicated data.

Figure 1:
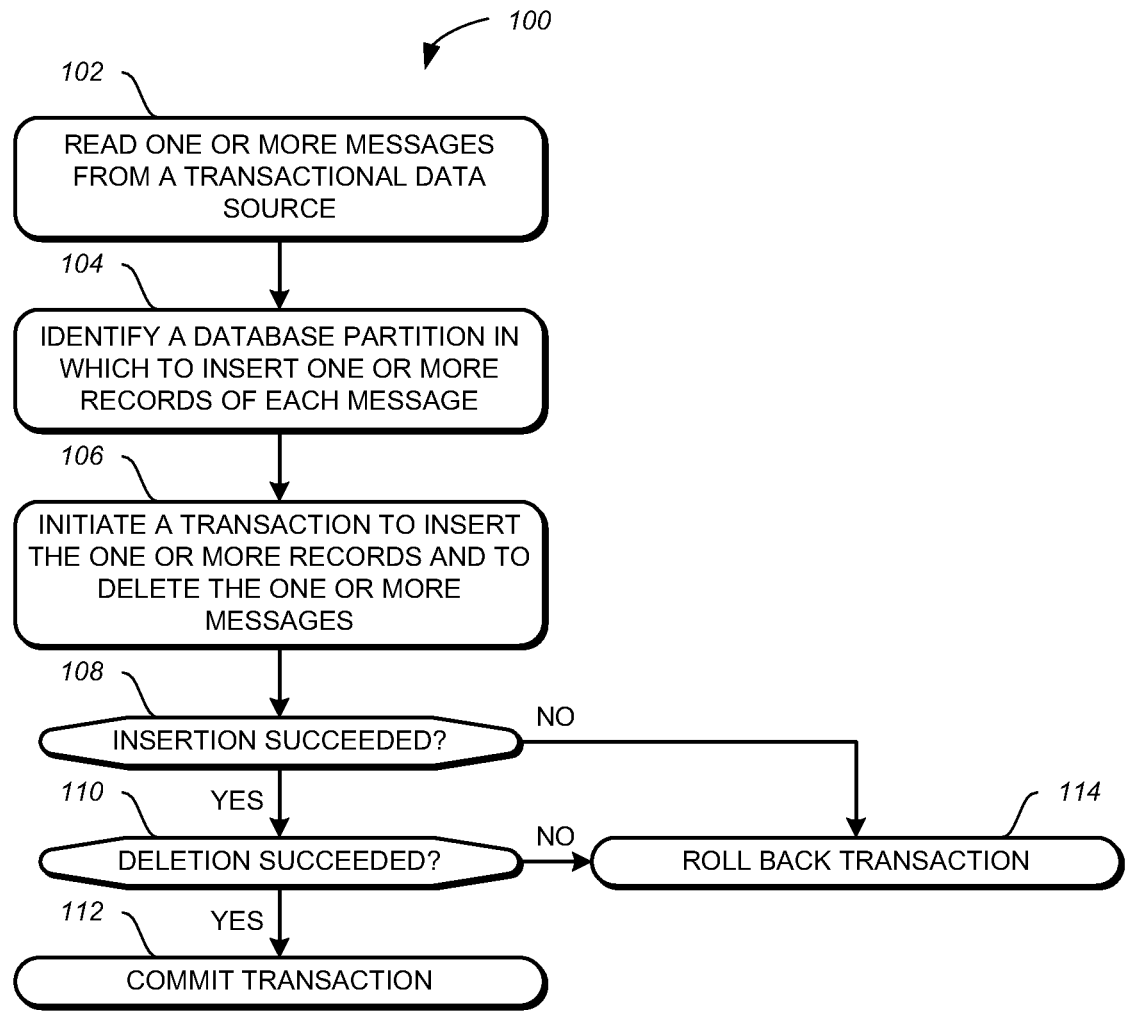
FIG. 1 depicts a process for transferring data from transactional data sources to partitioned databases according to an implementation.

Depicted in FIG. 1 is a process 100 for transferring data from transactional data sources to partitioned databases according to an implementation. At 102, one or more messages are read from a transactional data source. Each message includes one or more records to be inserted into a database that comprises a plurality of partitions.

One of the plurality of partitions of the database in which the one or more records of each message are to be inserted is identified at 104. A single transaction is then initiated at 106 to insert the one or more records of each message into the one partition and to delete the one or more messages from the transactional data source. Combining the insertion of the one or more records and the deletion of the one or more messages into the single transaction ensures that neither operation can commit (e.g., written to disk) without the other.

A determination is made at 108 as to whether insertion of the one or more records of each message into the one partition succeeded. If insertion of the one or more records of each message into the one partition succeeded, then a determination is made at 110 as to whether deletion of the one or more messages from the transactional data source succeeded. If deletion of the one or more messages from the transactional data source also succeeded, then the single transaction is committed at 112. The order in which the insertion of the one or more records and the deletion of the one or more messages are carried out does not matter.

On the other hand, if it is determined at 108 that insertion of the one or more records of each message into the one partition failed (e.g., at least one record of at least one message was not successfully inserted into the one partition) or if it is determined at 110 that deletion of the one or more messages from the transactional data source failed (e.g., at least one message was not successfully deleted from the transactional data source), then the single transaction is rolled back at 114. Data loss is thus avoided when record insertion fails because message deletion will be rolled back. In addition, data duplication is avoided when message deletion fails because record insertion will be rolled back.

Failure of an insertion into the database or deletion from the transactional data source may be caused by any number of things, such as, the database crashing, the transactional data source crashing, connection to the database being lost, connection to the transactional data source being lost, and so forth. However, because the insertion of record(s) and the deletion of message(s) are part of the same transaction, the insertion cannot commit without the deletion committing, and vice versa. This ensures no data loss and no data duplication when data transfer is restarted after failure.

Figure 2:
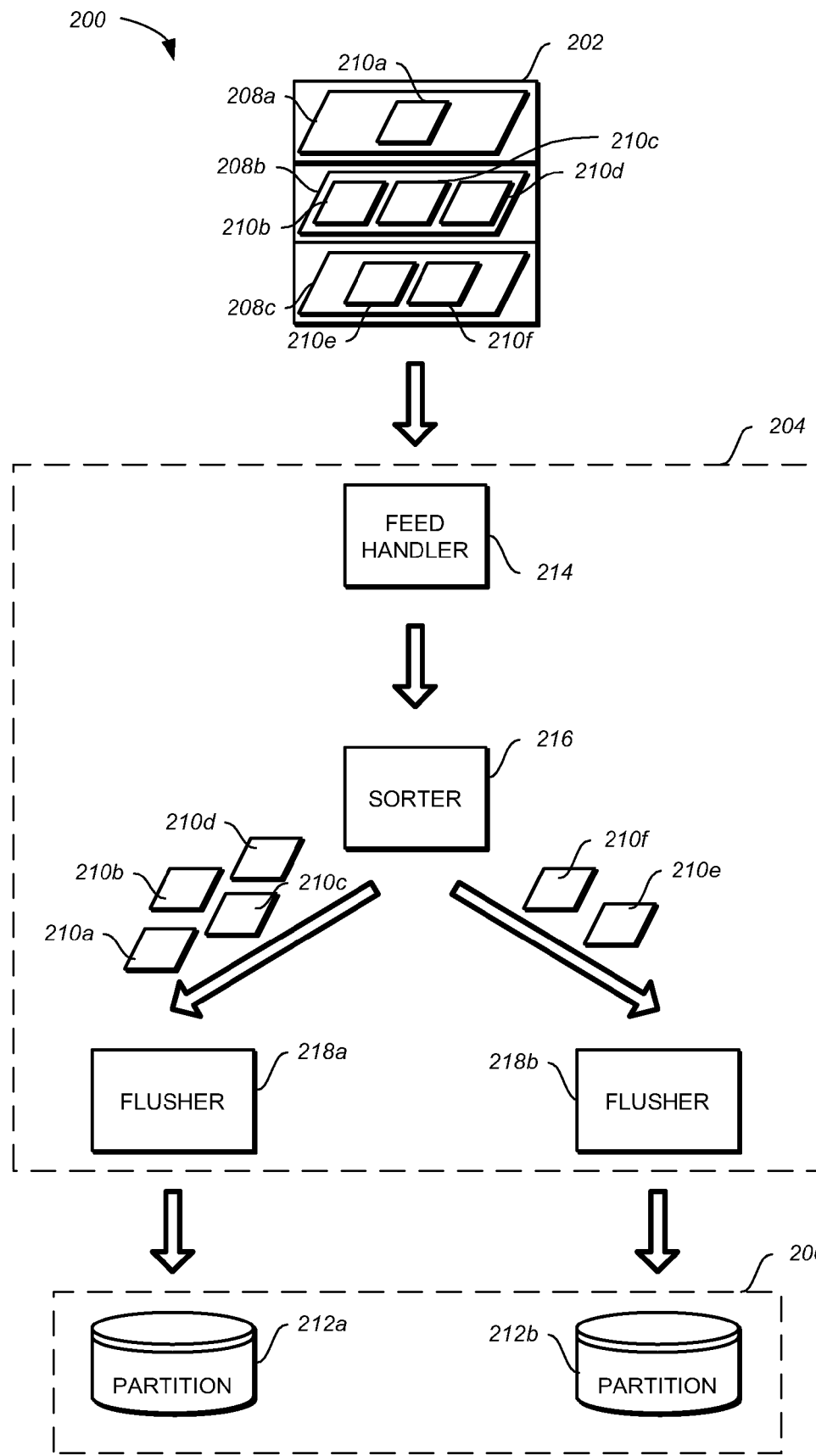
FIG. 2 illustrates a system according to an implementation.

Illustrated in FIG. 2 is a system 200 according to an implementation. System 200 includes a transactional data source 202, a data stream engine 204, and a database 206. Transactional data source 202 includes a plurality of messages 208a-208c. Each message 208 includes one or more records 210. In one implementation, transactional data source 202 is a queue. Database 206 includes a plurality of partitions 212a-212b.

Although not illustrated in FIG. 2, system 200 may include additional entities, such as, database server(s), other data source(s), other database(s), or the like. In addition, transactional data source 202 may include other messages (not illustrated). Further database 206 may include other partitions (not illustrated).

Data stream engine 204 includes a feed handler 214, a sorter 216, and flushers 218a-218b. Feed handler 214 reads messages 208a-208c from transactional data source 202. Messages 208a-208c may be read together (e.g., around the same time) or separately (e.g., at different times). For each message 208 read by feed handler 214, sorter 216 identifies one of partitions 212a-212b of database 206 in which to insert the one or more records 210 of the message 208 and directs the one or more records 210 of the message 208 to the flusher 218 servicing the one partition 212.

In the implementation, sorter 216 has identified partition 212a of database 206 for messages 208a and 208b and partition 212b of database 206 for message 208c. As a result, record 210a of message 208a and records 210b-210d of message 208b have been directed to flusher 218a, which services partition 212a, and records 210e-210f of message 208c have been directed to flusher 218b, which services partition 212b. Each flusher 218 is directly connected to the partition 212 serviced by the flusher 218.

Flusher 218a then initiates a transaction to insert records 210a-210d into partition 212a and to delete messages 208a-208b from transactional data source 202. Rather than initiating a single transaction for records 210 of both messages 208a and 208b, separate transactions may be initiated by flusher 218a for records 210 of each message. Flusher 218b initiates a separate transaction to insert records 210e-210f into partition 212b and to delete message 208c from transactional data source 202. The transaction initiated by flusher 218b may be running in parallel with the transaction initiated by flusher 218a.

Other components (not shown) may be included in data stream engine 204. For example, additional flushers (not illustrated) may be added to data stream engine 204 to service other partitions (not illustrated) of database 206 and/or to have multiple flushers servicing each partition 212 of database 206. Hence, if more than one flusher 218 is servicing partition 212a, then message 208a may be directed to one flusher, while message 208b may be directed to another flusher. The number of flushers 218 servicing each partition 212 need not be the same.

By pre-sorting messages based which partition records of each message are destined and having a direct connection between each flusher and corresponding partition, higher data throughput is possible because database 206 will no longer have to worry about routing records 210 to the correct partition 212. In addition, flusher utilization scales linearly. For example, if data throughput to database 206 is 40,000 records/second (i.e., 20,000 records/second to each partition 212), then adding a new partition (not illustrated) to database 206 and a new flusher (not illustrated) to data stream engine 204 to service the new partition will increase data throughput to 60,000 records/second.

Messages 208 included in each record 210 may be destined for more than one partition 212 of database 206. For example, record 210c of message 208b may be destined for partition 212b rather than partition 212a. If a message 208 includes records 210 destined for more than one partition 212 of database 206, then sorter 216 may identify the partition 212 in which to insert the records 210 of the message 208 based on, for instance, the partition 212 in which most of the records 210 of the message 208 are destined, the partition 212 in which the first record 210 of the message 208 is destined, or the like.

The partition 212 in which each record 210 of the message 208 is destined may be determined by comparing one or more partitioning key values of the record 210 to a partitioning key lookup table for database 206. A partitioning key value of a record is the value in a field of the record that corresponds to a partitioning key of a database. Once all records 210 of the message 208 are inserted into a particular partition 212 of database 206, those records 210 not destined for the particular partition 212 will have to be re-routed to the correct partition 212. However, this should be a rare occurrence as records in the same message will usually cluster around the same partitioning key values.

Data stream engine 204 may be implemented through one or more processors, memories, and/or other computer hardware. Thus, when feed handler 214 reads messages 208 from transactional data source 202, those messages 208 may be stored in memory. Feed handler 214, sorter 216, and each flusher 218 can be implemented as a separate thread. To give an example, a first thread acting as feed handler 214 browses transactional data source 202 and reads messages 208 from transactional data source 202 without removing messages 208 from transactional data source 202.

The first thread submits records 210 from messages 208 to a second thread acting as sorter 216. The second thread then determines which partition 212 in database 206 records 210 from each message 208 should be written to and directs records 210 of each message 208 to a third thread acting as flusher 218a or a fourth thread acting as flusher 218b, which are connected to partition 212a and partition 212b, respectively.

A transaction combining deletion of messages 208a-208b from transactional data source 202 and insertion of records 210a-210d into partition 212a of database 206 is initiated by the third thread. A separate transaction combining deletion of message 208c from transactional data source 202 and insertion of records 210e-210f into partition 212b of database 206 is initiated by the fourth thread. The delete of the message from the transactional data source and the insert of records in the message to the database are performed by the same thread because all operations in the same transaction must be from the same thread. The third thread may initiate a separate transaction for each message 208a and 208b. However, all records of a single message are part of the same transaction.

The third and fourth threads may manage their own transactions using, for instance, the XA 2-phase commit protocol defined by the X/Open Distributed Transaction Processing (DTP) group. Consequently, there may be multiple parallel transactions running, one or more for each database partition with transaction data specifically directed to that database partition, which minimizes crosstalk (e.g., re-routing records from one partition to another). Each thread may have an associated memory queue in which data to be processed by a thread is placed on the memory queue associated with the thread.

Upon a restart of data stream engine 204 after a failure (e.g., system crash), any messages involved in transactions not yet committed will still be in transactional data source 202 and available for processing again. If connection to transactional data source 202 or database 206 is lost, then all records in memory from the data source or destined for the database are discarded, any remaining connections are disconnected, all connections are then re-established, and all discarded data will be on transactional data source 202 for re-processing. This allows all data to be processed and inserted into database 206 once without duplicates and prevents data from being lost even with failures and restarts.

By pre-sorting messages, combining record insertion and message deletion into a single transaction, and having a dedicated connection to each database partition, higher data throughput, no data loss, and no data duplication are achieved when transferring large volumes of data from transactional data sources to partitioned databases in restartable environments.

This disclosure can take the form of an entirely hardware implementation, an entirely software implementation, or an implementation containing both hardware and software elements. In one implementation, this disclosure is implemented in software, which includes, but is not limited to, application software, firmware, resident software, microcode, etc.

Furthermore, this disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 3:
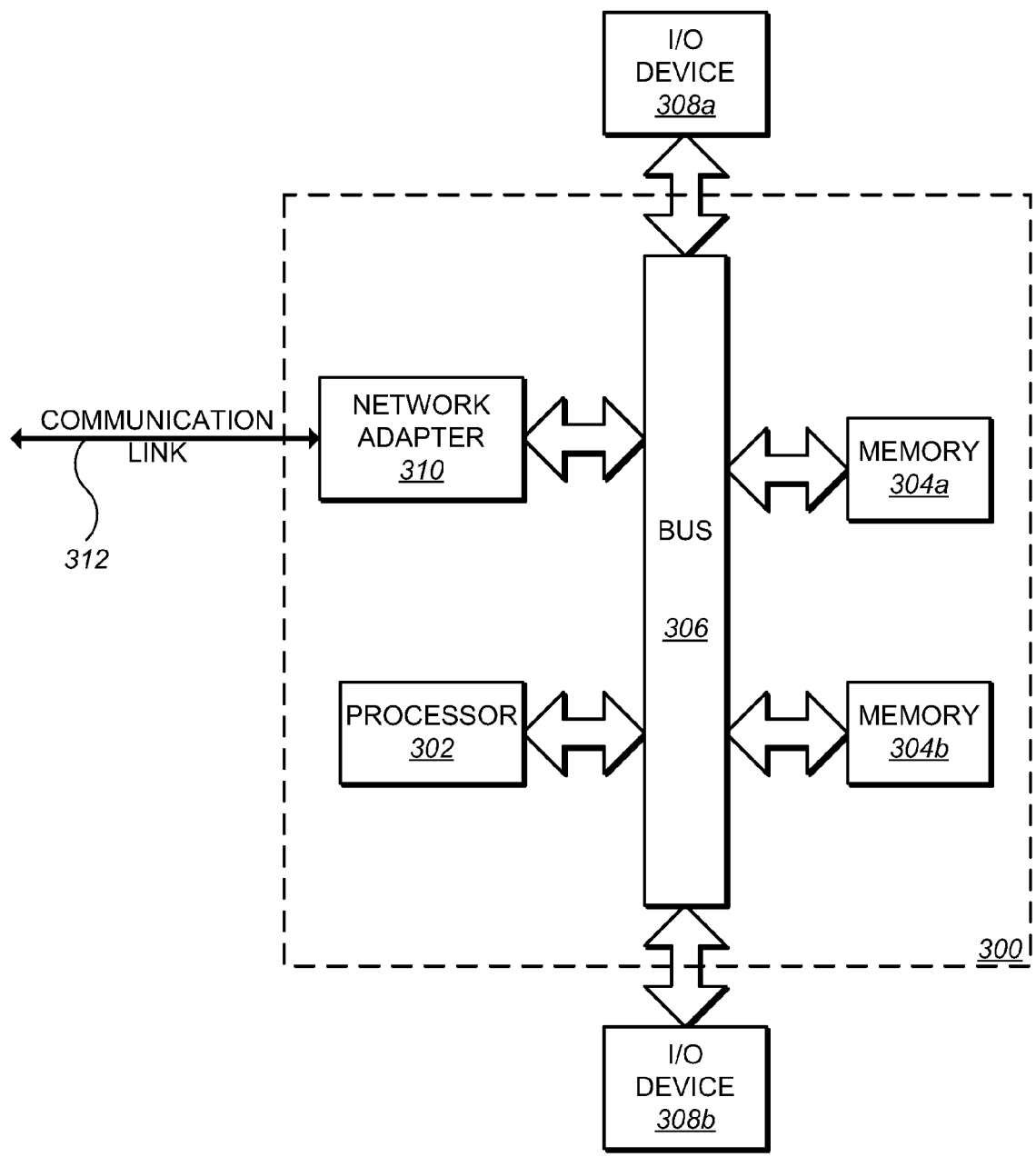
FIG. 3 is a block diagram of a data processing system with which implementations of this disclosure can be implemented.

FIG. 3 depicts a data processing system 300 suitable for storing and/or executing program code. Data processing system 300 includes a processor 302 coupled to memory elements 304a-b through a system bus 306. In other implementations, data processing system 300 may include more than one processor and each processor may be coupled directly or indirectly to one or more memory elements through a system bus.

Memory elements 304a-b can include local memory employed during actual execution of the program code, bulk storage, and cache memories that provide temporary storage of at least some program code in order to reduce the number of times the code must be retrieved from bulk storage during execution. As shown, input/output or I/O devices 308a-b (including, but not limited to, keyboards, displays, pointing devices, etc.) are coupled to data processing system 300. I/O devices 308a-b may be coupled to data processing system 300 directly or indirectly through intervening I/O controllers (not shown).

In the implementation, a network adapter 310 is coupled to data processing system 300 to enable data processing system 300 to become coupled to other data processing systems or remote printers or storage devices through communication link 312. Communication link 312 can be a private or public network. Modems, cable modems, and Ethernet cards are just a few of the currently available types of network adapters.

While various implementations for transferring data from transactional data sources to partitioned databases in restartable environments have been described, the technical scope of this disclosure is not limited thereto. For example, this disclosure is described in terms of particular systems having certain components and particular methods having certain steps in a certain order. One of ordinary skill in the art, however, will readily recognize that the methods described herein can, for instance, include additional steps and/or be in a different order, and that the systems described herein can, for instance, include additional or substitute components. Hence, various modifications or improvements can be added to the above implementations and those modifications or improvements fall within the technical scope of this disclosure.

The invention claimed is:

1. A method for transferring data from a transactional data source to a database, the database managed by a database management system (DBMS), the method comprising:

reading a message from the transactional data source, the message comprising one or more records to be inserted into the database comprising a plurality of partitions, wherein each of the plurality of partitions is a logical division of the database that is defined based on one or more partitioning keys in at least one column of a table of the database, and wherein the transactional data source comprises a queue of data packets that is independent and distinct from both the database and the DBMS;

initiating a first transaction, using a single thread, to both (i) insert the one or more records into a partition of the plurality of partitions and (ii) delete the message from the transactional data source, wherein the message comprising the one or more records remains in the transactional data source until the first transaction is committed;

upon determining that both (i) the insertion of the one or more records into the partition and (ii) the deletion of the message from the transactional data source have successfully completed, committing, using the single thread, both (i) the insertion into the partition and (ii) the deletion of the message from the transactional data source; and upon determining that at least one of (i) the insertion of the one or more records into the partition and (ii) the deletion of the message from the transactional data source has failed, rolling back, using the single thread, both (i) the insertion into the partition and (ii) the deletion of the message from the transactional data source.

2. A computer program product comprising a computer readable medium, the computer readable medium including a computer program for transferring data from a transactional data source to a database, the database managed by a database management system (DBMS), wherein the computer program, when executed on a computer, causes the computer to:

read a message from the transactional data source, the message comprising one or more records to be inserted into the database comprising a plurality of partitions, wherein each of the plurality of partitions is a logical division of the database that is defined based on one or more partitioning keys in at least one column of a table of the database, and wherein the transactional data source comprises a queue of data packets that is independent and distinct from both the database and the DBMS;

initiate a first transaction, using a single thread, to both (i) insert the one or more records into a partition of the plurality of partitions and (ii) delete the message from the transactional data source, wherein the message comprising the one or more records remains in the transactional data source until the first transaction is committed;

upon determining that both (i) the insertion of the one or more records into the partition and (ii) the deletion of the message from the transactional data source have successfully completed, commit, using the single thread, both (i) the insertion into the partition and (ii) the deletion of the message from the transactional data source; and upon determining that at least one of (i) the insertion of the one or more records into the partition and (ii) the deletion of the message from the transactional data source has failed, roll back, using the single thread, both (i) the insertion into the partition and (ii) the deletion of the message from the transactional data source.

3. The method of claim 1, further comprising:

reading a second message from the transactional data source, the second message comprising one or more records to be inserted into the database;

identifying a second of the plurality of partitions of the database in which to insert the one or more records of the second message;

initiating a second transaction to insert the one or more records of the second message into the second partition and to delete the one or more messages in the second message from the transactional data source; and committing the second transaction only when the insertion of the one or more records of the second message into the second partition and the deletion of the second message from the transactional data source both succeed.

4. The method of claim 1, wherein there is at least one dedicated connection to each partition of the database.

5. The method of claim 1, wherein the transactional data source is a queue storing a plurality of data packets, and wherein the message is one of the plurality of data packets.

6. The method of claim 1, further comprising:

identifying the partition of the plurality of partitions of the database in which to insert the one or more records of the message, comprising:

comparing at least one partitioning key within the one or more records to a partition key lookup table for the database; and determining that an entry within the partition key lookup table associated with the partition corresponds to the at least one partitioning key within the one or more records.

7. The method of claim 1, wherein the transactional data source is a data store containing a plurality of messages, and wherein the message is one of the plurality of messages.

8. The computer program product of claim 2, wherein the computer program further causes the computer to:

read a second message from the transactional data source, the second message comprising one or more records to be inserted into the database;

identify a second of the plurality of partitions of the database in which to insert the one or more records of the second message;

initiate a second transaction to insert the one or more records of the second message into the second partition and to delete the one or more messages in the second message from the transactional data source; and commit the second transaction only when the insertion of the one or more records of the second message into the second partition and the deletion of the second message from the transactional data source both succeed.

9. The computer program product of claim 2, wherein there is at least one dedicated connection to each partition of the database.

10. The computer program product of claim 2, wherein the transactional data source is a data store containing a plurality of messages, and wherein the message is one of the plurality of messages.

11. The method of claim 3, further comprising:

rolling back the second transaction when at least one of (i) insertion of the one or more records of the second message into the second partition or (ii) deletion of the second message from the transactional data source fails.

12. The method of claim 3, wherein the first transaction and the second transaction are running in parallel.

13. The computer program product of claim 8, wherein the computer program further causes the computer to:

roll back the second transaction when at least one of (i) insertion of the one or more records of the second message into the second partition or (ii) deletion of the second message from the transactional data source fails.

14. The computer program product of claim 8, wherein the first transaction and the second transaction are running in parallel.

* * * * *